June 26, 1962     J. H. SCHLESSEL ETAL     3,041,506
ELECTRICAL CONTROL CENTERS

Filed Oct. 28, 1958     4 Sheets-Sheet 1

June 26, 1962 J. H. SCHLESSEL ETAL 3,041,506
ELECTRICAL CONTROL CENTERS
Filed Oct. 28, 1958 4 Sheets-Sheet 2

June 26, 1962     J. H. SCHLESSEL ETAL     3,041,506
ELECTRICAL CONTROL CENTERS

Filed Oct. 28, 1958     4 Sheets-Sheet 3

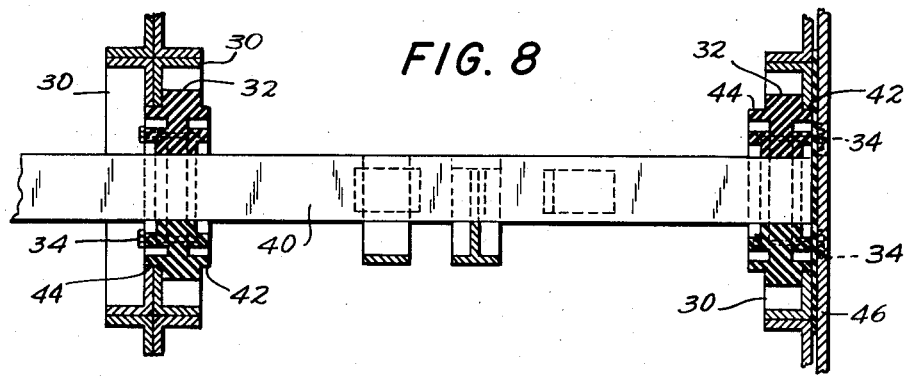
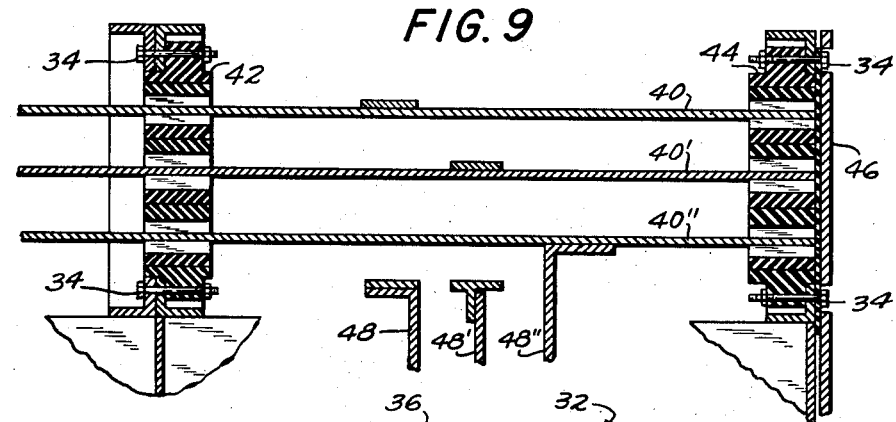
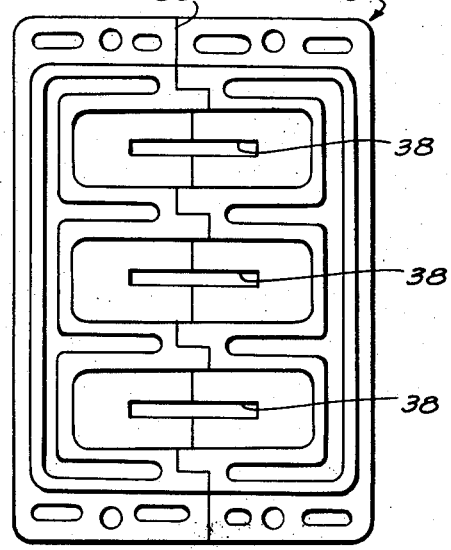

United States Patent Office 3,041,506
Patented June 26, 1962

3,041,506
ELECTRICAL CONTROL CENTERS
Joseph H. Schlessel, Flushing, and Gerald Hornstein, Brooklyn, N.Y., assignors to Federal Pacific Electric Company, a corporation of Delaware
Filed Oct. 28, 1958, Ser. No. 770,159
14 Claims. (Cl. 317—120)

This invention relates generally to an electrical control center and, more particularly, to an enclosed electrical control center for housing control apparatus of the type utilized for controlling distribution circuits connected to electric power utilizing devices.

One object of the present invention is the provision of an improved enclosed control center for centralizing and enclosing various types of control apparatus, such as motor control apparatus, said control center being of standardized universal design which may be assembled as individual units or in a selected grouping containing the requisite number of apparatus or housing units. Pursuant to this object of the present invention the control center is adapted to be assembled using standard components to accommodate a wide range of combinations of standardized units, which may be of different circuit designs and which may be ony one of several modular heights.

Another object of the present invention is the provision of an improved bus bar insulator arrangement for achieving flexibility in the grouping of modular control center enclosures. Universal insulators are assembled to enclosure walls both as an end mounting and as an intermediate mounting for bus bars that extend to or through an enclosure wall.

Yet another object of the present invention is the provision of a generally improved electrical control center of standardized and universal design which is of simple design and construction, and which lends itself to easy and economical assembly either as an individual unit or in a grouping as dictated by the requirements of the installation.

A further object is the provision of a flexible type of control center capable of being transported as universal relatively small components that are readily assembled near the use destination with a high order of accuracy but without resort to specialized welding fixtures, or the like.

Other objects, features and advantages of the present invention will become apparent as the description of an illustrative embodiment thereof proceeds when considered in connection with the accompanying drawings in which:

FIG. 8 is an enlarged partial sectional view taken on the line 8—8 of FIG. 4;

FIG. 9 is an enlarged sectional view taken on the line 9—9 of FIG. 4; and

FIG. 10 is a side elevational view of a horizontal bus bar insulator support.

Figure 1:
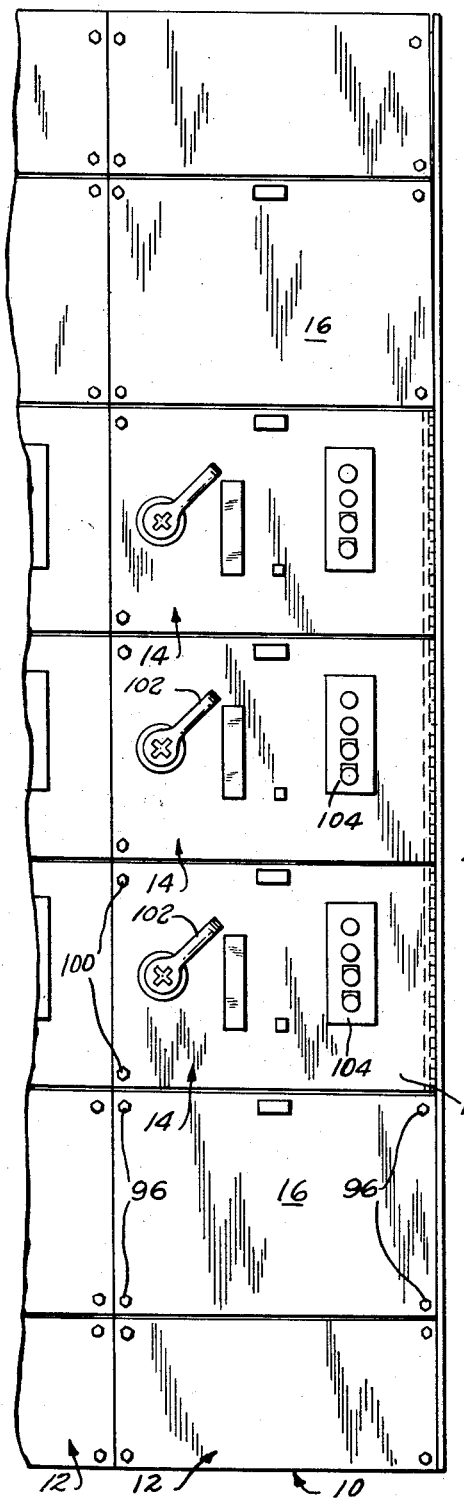
FIG. 1 is a partial front view of a control center formed in accordance with the present invention.

Referring to the drawings, and more particularly to FIGS. 1–4 thereof, there is shown an enclosed control center 10 comprising a plurality of vertical sections 12 which are disposed and interconnected in side-by-side relation. The sections 12 are preferably of standardized dimensions and may be used singly or in groups in accordance with the dictates of the particular installation. Each section is adapted to removably mount a series of apparatus or housing units 14 to the capacity of the section. In section 12 shown at the right hand side of FIG. 1 three such units are shown installed within compartments closed by doors 15 hinged to narrow vertical wall panels 18, and the unused spaces or compartments for additional future units are shown covered with removable cover plates 16.

Figure 2:
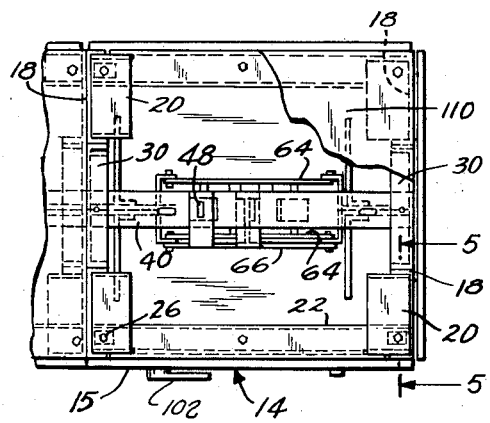
FIG. 2 is a top view thereof with the top cover plate shown partially broken away to reveal internal structural details.
Figure 5:
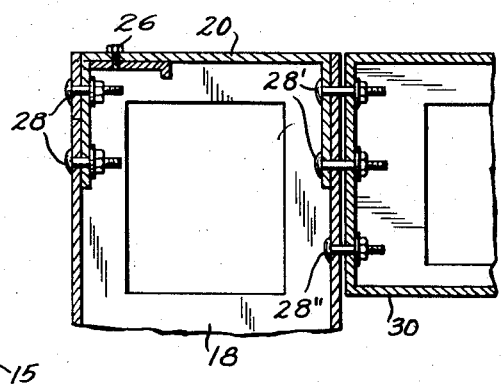
FIG. 5 is a sectional view, on an enlarged scale, taken on the line 5—5 of FIG. 2.
Figure 6:
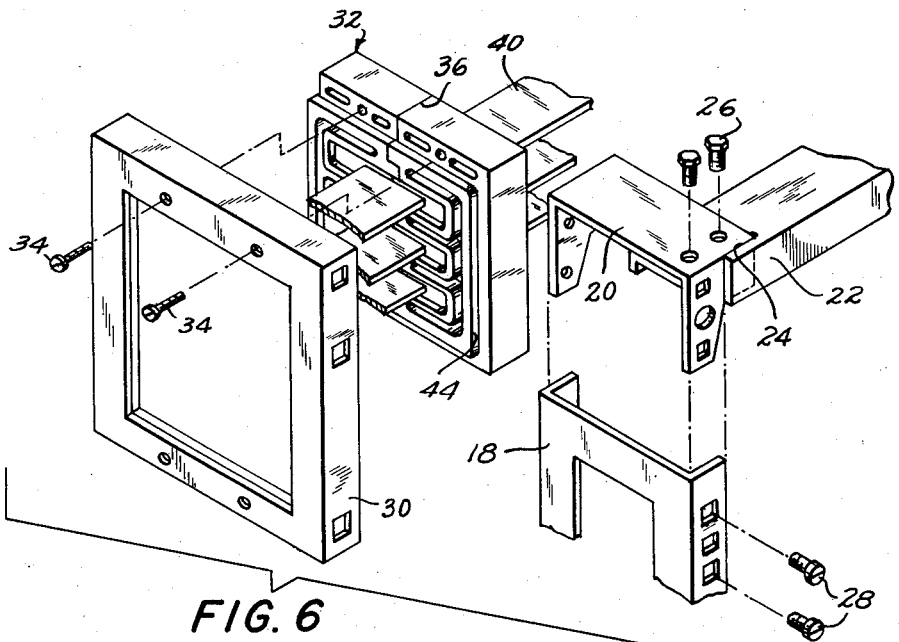
FIG. 6 is a perspective exploded view showing the assembly of the horizontal bus bar insulator supports to the top of the frame.

Each housing section 12 comprises four vertically extending narrow channel shaped wall panels 18 disposed at the corners of the section, said panels being secured in a fixed disposition by the frame structure to be described hereinafter. With reference to FIGS. 2, 5 and 6, at each upper corner there is provided a U-shaped corner bracket 20 which interconnects the horizontal angle members 22 with panels 18. The members 22 are slotted as indicated at 24 to receive brackets 20, the latter being bolted to the members 22 as indicated at 26. The brackets 20 interfit with panels 18 and are mutually secured by means of the bolts 28 and 28'. At the opposite sides of the section there are provided quadrilateral peripherally continuous frame supports 30 for the horizontal bus bar insulator supports 32, each support 30 being bolted to panels 18 and brackets 20 together by the bolts 28', and to the panels 18 alone by the bolts 28". The insulator supports 32 interfit in companion frame supports 30 and are secured thereto by means of the bolts 34. As best shown in FIGS. 6 and 10, the insulator supports 32 are of two-piece construction and interfit along the line 36, said supports being preferably molded of a suitable insulating material to the shape shown in said figures. The two parts of the insulator support 32 collectively define therebetween three vertically aligned apertures 38 for the passage therethrough of the horizontal bus bars 40, 40' and 40".

Pursuant to the present invention, the insulator support 32 is provided with a narrow peripherally extending shoulder 42 at one side and a wide peripherally extending shoulder 44 at the opposite side, the narrow shoulder being dimensioned to interfit with frame 30 in flush relation therewith as shown at the right in FIGS. 8 and 9 and the wide shoulder being dimensioned to extend through and fit within an adjacent pair of frames 30 of two sections 12 disposed back-to-back, in flush relation therewith as shown at the left in FIGS. 8 and 9. Thus the wide shoulder is double the width of the narrow shoulder but the shoulder outline dimensions correspond. In a row of sections 12, each section has an insulator supporting the horizontal bus at only one side of the section, except that the end section 12 shown in detail uses an insulator 32 at both sides. The double width shoulder is effective in insuring alignment of adjacent sections 12 at the critical region of the bus bars, when the sections are to be assembled as an installation. The same standardized insulator support may be used as an end support in which the narrow shoulder interfits with frame 30 or as an intermediate support in which the wide shoulder interfits with an adjacent pair of frames 30, by simply reversing or turning over the support. Each end section is provided with a pair of insulator supports 32 and the end support as well as the ends of the bus bars 40, 40' and 40" therein are covered by a sheet 45 of insulation, held in place by bolts 34. The end section 12 has a relatively thin side covering plate 46. Where a single section is to be used both end supports will be so covered but at an intermediate position of a multi-section control center, as shown in FIGS. 8 and 9, the same horizontal bus bars will bridge the sections and a single common insulator support will be used at adjacent walls of adjacent sections, such common support having an adjacent pair of frames interfitting therewith at the wide shoulder thereof. The vertical bus bars 48, 48′ and 48″ are suitably connected to the horizontal bus bars 40, 40′ and 40″, respectively.

At vertically spaced positions, the channel wall panels 18 are connected at the opposite sides thereof by the filler members 50. Member 50 is constituted by a channel member having additional parallel laterally extending flanges 52 and 54. At vertically spaced positions, a pair of members 50 are secured to each other, as by means of bolts, in back-to-back relation (FIG. 7) and the flanges 52 thereof are bolted or otherwise secured to companion flanges 56 of panels 18. It will be understood that members 50 at the opposite sides of the sections are in horizontal registry, said members interconnecting the panels 18 to form with the latter the section sidewalls and a rigid section.

Figure 7:
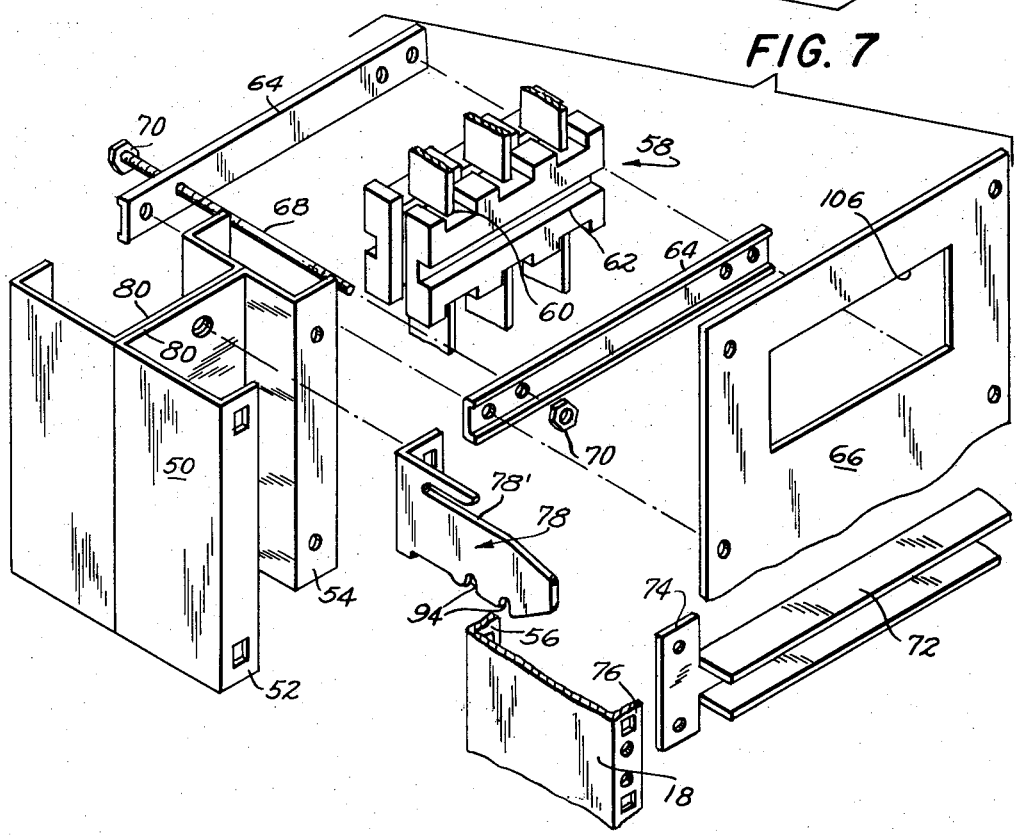
FIG. 7 is a perspective exploded view showing the assembly of the vertical bus bar insulator supports to the frame.

The vertical bus bar insulator supports 58 are of two-piece construction as best shown in FIG. 7 and collectively define therebetween the apertures 60 to accommodate the vertical bus bars. The supports 58 have at the opposite sides thereof horizontal channels 62 to receive the horizontal channel members 64 which are secured to the filler members 50, the latter and members 64 thereby forming a support structure for the insulator supports 58. More particularly, the opposite ends of members 64 and the enclosure plate 66 are secured to the flanges 54 of filler members 50 by the bolts 68 having their opposite ends threaded to receive companion nuts 70. The upper corners of the plate 66 are secured directly to the flanges 54, the plates 66 being disposed to form rear walls of the compartments for the housing units 14. Thus the filler members 50 and associated structure are disposed at levels to correspond to the spacing of the units 14 of standardized dimension, there being an insulator support 58 at each of said levels. It will be understood that the filler members may be spaced at levels as desired, uniformly or non-uniformly, and certain of such filler members need not be utilized as a support for an insulator support 58. The members 64 in assembled relation serve to clamp the parts of supports 58 to the vertical bus bars and position the latter in the section.

Figure 3:
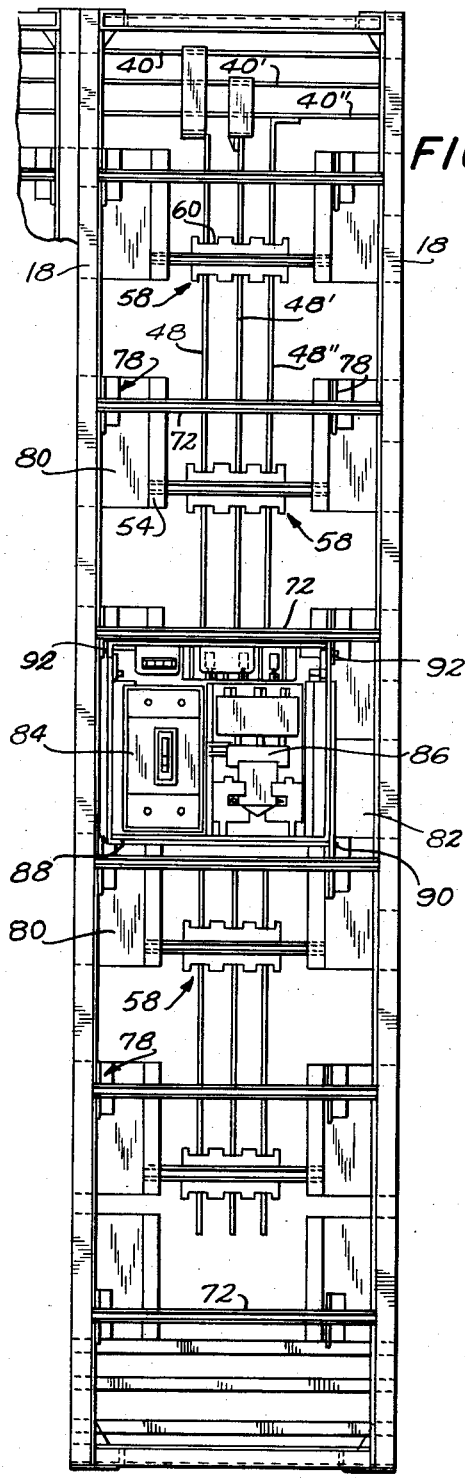
FIG. 3 is a view similar to FIG. 1 with the front cover plates and doors shown removed and with only one control unit installed.
Figure 4:
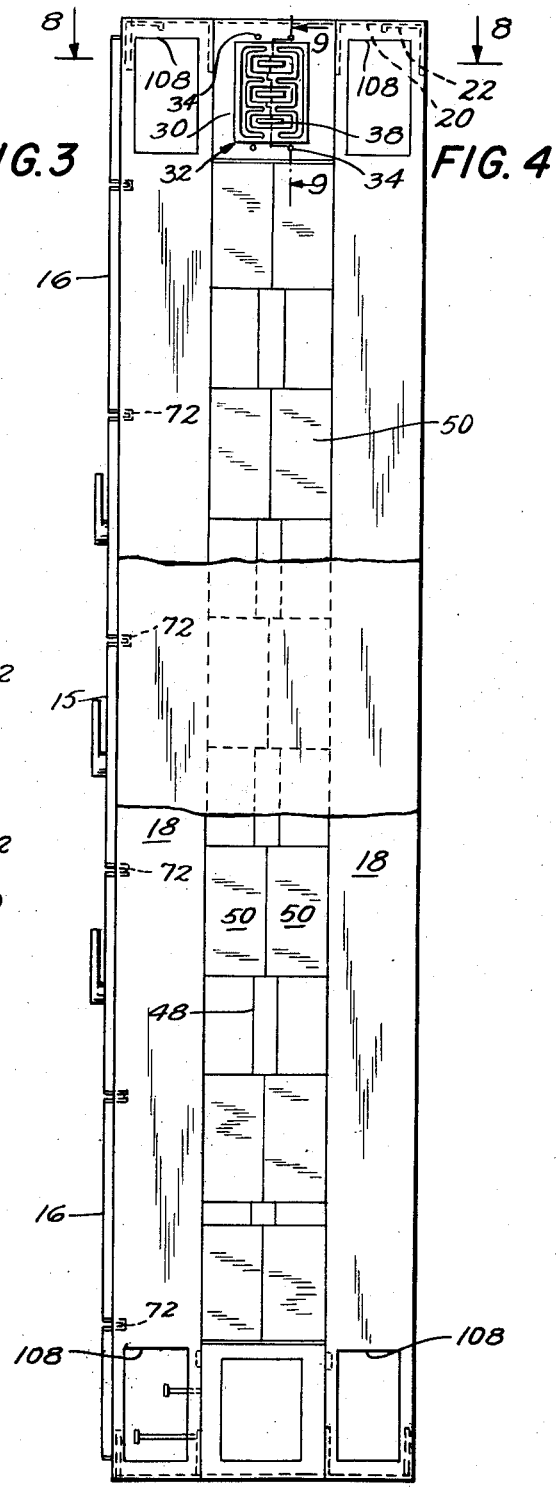
FIG. 4 is a side view of the control center of FIG. 1 with the side cover plate partially broken away.

Between each apparatus unit 14 and at the top of the upper unit and the bottom of the lower unit is disposed a horizontal bar 72 in the form of a channel member having end mounting flanges 74 which are bolted to the flanges 76 of the corner panels 18. Bar 72 may be used as a rest for a unit 14 during insertion thereof, and bar 72 also coacts with the top and bottom edges of doors 15, thereby closing off the crevice between the doors. At spaced levels corresponding to the spacing of the compartments for units 14 there are provided companion pairs of combination support and latch devices 78 for said units which are secured to the base walls 80 of filler members 50, advantageously by means of the same bolts that join back-to-back members 50 to each other. As shown in FIG. 3, the pairs of devices 78 are offset towards one side of the section so that in the installed position of the units a vertical wiring space 82 is provided at the opposite side of the units, such space extending substantially the full height of the section so that wires may be readily connected to terminal blocks of the apparatus units.

The apparatus units 14 may be of any desired type and the units illustrated are motor starter units comprising a circuit breaker 84 and a starting device 86 for controlling the operation of an electric motor. The apparatus units 14 are of a fixed height or a multiple thereof so that the units may be readily interchanged for controlling devices of different ratings. Thus a larger unit may be substituted for a plurality of the smaller units. It will be noted that the intermediate section side walls are open between the filler members 50 to thereby provide proper ventilation for the units. Each unit comprises an enclosure 88 dimensioned to be received in a companion section compartment, said enclosure having pivot pins 90 at the lower rear corners thereof which are mounted on a companion pair of guide rails 78′. The enclosure is also provided with latching and locking devices generally indicated at 92 at the upper end of the opposite side walls which coact with the latching recesses 94 of the devices 78 next above the devices which support pins 90 of the enclosure next.

The dummy compartments which provide space for future units are covered at the front by a removable panel or cover plate 16, having fasteners 96 at the corners thereof. The compartments housing units have a door 15 hingedly mounted at one side to a flange 76 of panel 18, the opposite side of the door having detachable fasteners 100 which are received in complementary fittings provided in a companion flange 76. Mounted on door 98 is a handle 102 which is interconnected with the handle of the circuit breaker 84 in the door closed position through a suitable interlocking mechanism which prevents the door from being opened in a normal manner while the circuit breaker is closed. The door also mounts other control and indicating devices 104 for the apparatus unit disposed therebehind.

The plates 66 are provided with quadrilateral openings 106 which are adapted to register with the three plug-in electrical connectors (not shown) of an apparatus unit on the connection thereof with the vertical bus bars, as will be understood by those skilled in the art. The panels 18 are provided with upper and lower cutouts 108 for cables extending between sections, it being understood that end section walls will be provided with a side cover plate 46 to fully enclose the section and that the latter is also provided with top cover plate 110. Apparatus units may be mounted in the front and rear of each housing section in back-to-back relation by plugging-in such units to the vertical bus bars. Only one set of vertical bus bars and supports is required since they are positioned at a median position in the section with the plug-in connectors of the units extending over no more than one-half the width of the bus bar contact faces. If desired, a housing section may be constructed to mount apparatus units in the front only thereof in which case the rear of the section will be provided with suitable covering structure devoid of provisions to mount apparatus units.

The standardized section structure of the present invention permits the assembly of multiple individual apparatus units in a relatively small amount of space and such units may be interchanged as desired or added to the capacity of the section. Multiple grouped sections containing any desired number of apparatus units may be readily assembled to the user's specific requirements.

Various additional modifications of the above embodiments of the invention will readily occur to those skilled in the art, and therefore the invention should be broadly construed in accordance with its full spirit and scope.

Having thus described our invention what we claim as new and desire to secure by Letters Patent is:

1. A section structure for mounting apparatus units, comprising pairs of upright narrow wall panels having in-turned edges and disposed at opposite sides of the structure in predetermined spaced disposition at each side of the structure, means comprising pairs of filler members secured in back-to-back relation between said upright panels and secured thereto, said filler members being disposed in vertically spaced positions and pairs of said filler members disposed in said relation at the opposite sides of the structure being in horizontal alignment, said pairs of filler members being adapted to position and support vertical bus bars in the structure, said filler members each being in the form of a vertical channel member comprising spaced sidewalls interconnected at one side by a base wall, the opposite sides of said sidewalls having flanges extending laterally therefrom, one of said flanges being secured to a respective inturned edge of a companion one of said upright narrow wall panels and the other one of the flanges of each filler member defining a mounting for positioning and supporting the vertical bus bar.

2. A section structure for mounting apparatus units, comprising pairs of upright narrow flanged wall panels disposed at opposite sides of the structure in predetermined spaced disposition at each side of the structure, means comprising pairs of filler members secured in back-to-back relation between said upright panels and secured thereto, said filler members being disposed in vertically spaced positions and pairs of said filler members disposed in said relation at the opposite sides of the structure being in horizontal alignment, said pairs of filler members being adapted to position and support vertical bus bars in the structure, said filler members each being in the form of a channel member comprising laterally spaced sidewalls of different widths interconnected at one side by a base wall, the opposite sides having flanges extending laterally therefrom and disposed in substantially parallel relation, the flange of the wider sidewall being secured to a flange of a companion upright panel with the other flange of each filler member defining a mounting for positioning and supporting the vertical bus bars.

3. A section structure for an electrical control center having apparatus units, comprising pairs of upright channel supports constituting side-wall elements of the section structure and disposed at opposite sides of the structure in predetermined spaced disposition, means comprising connected pairs of filler members disposed in back-to-back relation between said upright supports and secured thereto, said connected pairs of filler members being vertically spaced in the structure and pairs of said filler members at the opposite sides of the structure being in horizontal alignment, said filler members each being in the form of a channel member comprising laterally spaced differential width sidewalls interconnected at one side by a base wall, the opposite sides having flanges extending laterally therefrom and disposed in substantially parallel relation, the flange of the wider sidewall being secured to a companion upright support with the other flange defining a mounting for positioning and supporting the vertical bus bars, and means secured to a horizontally aligned pair of mountings for positioning and supporting the vertical bus bars.

4. A section structure for an electrical control center having apparatus units, comprising pairs of upright channel supports disposed at opposite sides of the structure in predetermined spaced disposition, means comprising connected pairs of filler members disposed in back-to-back relation between said upright supports and secured thereto, said connected pairs of filler members being vertically spaced in the structure and pairs of said filler members at the opposite sides of the structure being in horizontal alignment, said filler members each being in the form of a channel member comprising laterally spaced sidewalls interconnected at one side by a base wall, the opposite sides having flanges extending laterally therefrom and disposed in substantially parallel relation, the flange of one sidewall being secured to a companion upright support and the other flange defining a mounting for positioning and supporting the vertical bus bars, means secured to a horizontally aligned pair of mountings for positioning and supporting the vertical bus bars, and horizontally projecting pairs of guide members secured to said back to back base walls of respective pairs of said filler members in horizontal alignment to support the apparatus units in the structure.

5. In a section structure for an electrical control center having horizontal bus bars, support means therefor comprising an insulator support having a series of apertures extending therethrough to accommodate companion bus bars, and a mounting frame for said support having a mounting edge of predetermined thickness, said insulator support having shoulders at the opposite sides thereof complementary to said mounting frame and of different thicknesses related to said mounting edge thickness whereby the insulator support may be disposed to interfit at one side with said frame in flush relation with said mounting edge thereof and at the opposite side with a plurality of said frames in alignment with the mounting edges thereof.

6. A bus bar insulator support having apertures to accommodate companion bus bars, said support having projecting shoulders at the opposite sides thereof of different but related thicknesses whereby the insulator support may be disposed to selectively interfit with a companion frame support at one side and to extend through and align a plurality of such frames at the opposite side thereof.

7. A bus bar insulator support having apertures to accommodate companion bus bars, said support having projecting shoulders at the opposite sides thereof of different but related thicknesses whereby the insulator support may be disposed to selectively interfit with a companion frame support at one side and to extend through and align a plurality of such frames at the opposite side thereof, said insulator support being of two-part interfitting construction having a parting line extending transversely of said apertures.

8. A bus bar insulator support having a series of aligned apertures extending therethrough to accommodate companion bus bars, said support having peripherally extending shoulders at the opposite sides thereof of different thicknesses, one thickness being a multiple of the other thickness, whereby the insulator support may be disposed to selectively interfit with a companion support at one side and with a plurality of such supports at the opposite side thereof.

9. In combination, a bus bar insulator support and a mounting frame therefor, said insulator support having a series of aligned apertures extending therethrough to accommodate companion bus bars, said support having peripherally extending projecting shoulders at the opposite sides thereof of different thicknesess, one thickness being substantially greater than the other thickness, said mounting frame having a peripherally extending mounting edge of a thickness substantially equal to said one thickness, whereby the insulator support may be disposed to selectively interfit at one side with said frame in flush relation with said mounting edge thereof and at the opposite side with a plurality of aligned frames.

10. In combination, a bus bar insulator support and a mounting frame therefor, said insulator support having a series of aligned apertures extending therethrough to accommodate companion bus bars, said support having peripherally extending projecting shoulders at the opposite sides thereof complementary to said frame and of different thicknesses, one thickness being substantially greater than the other thickness, said insulator support being of two-part construction having a parting line extending transversely of said apertures and having complementary interfitting projections, said mounting frame having a peripherally extending mounting edge of a thickness substantially equal to said one thickness, whereby the insulator support may be disposed to substantially interfit at one side with said frame in flush relation with said mounting edge thereof and said insulator shoulder at the opposite side may project through and align a plurality of said frames positioned in back-to-back relation.

11. A section structure for mounting apparatus units, comprising upright flanged panels disposed at opposite sides of the structure in predetermined spaced disposition, means comprising flanged filler members disposed between said upright panels and flanges of said filler members being secured to respective flanges of said panels, said filler members being disposed in vertically spaced positions and pairs of filler members at the opposite sides of the structure being in horizontal alignment, supports on said pairs of filler members to position and support vertical bus bars in the structure, bus bar insulator supports for positioning and supporting horizontal bus bars, and mounting frames for said insulator supports disposed at opposite sides of the structure in horizontal alignment between said upright panels and secured thereto in vertical alignment with said filler members.

12. A section structure for mounting apparatus units, comprising upright supports disposed at opposite sides of the structure in predetermined spaced disposition, frame means comprising filler members disposed between said upright supports and secured thereto, said filler members being disposed in vertically spaced positions and pairs of filler members at the opposite sides of the structure being in horizontal alignment, supporting means on said pairs of filler members to position and support vertical bus bars at vertically spaced positions in the structure, and bus bar insulator supports for positioning and supporting horizontal bus bars, mounting frames for said insulator supports disposed at opposite sides of the structure in horizontal alignment between said upright supports and secured thereto in vertical alignment with said filler members, said insulator supports having laterally projecting shoulders at the opposite sides thereof of different but related thicknesses whereby each insulator support may be disposed to selectively interfit with said mounting frame at one side of the section or with a plurality of said frames at the opposite side of the section.

13. A section structure for mounting apparatus units, comprising upright supports disposed at opposite sides of the structure in predetermined spaced disposition, frame means comprising filler members disposed between said upright supports and secured thereto, said filler members being disposed in vertically spaced positions and pairs of filler members at the opposite sides of the structure being in horizontal alignment, supports secured to said pairs of filler members to position and support vertical bus bars, said supports being at vertically spaced positions in the structure, and bus bar insulator supports for positioning and supporting horizontal bus bars, mounting frames for said insulator supports disposed at opposite sides of the structure in horizontal alignment between said upright supports and secured thereto in vertical alignment with said filler member, said insulator supports having a series of aligned apertures extending therethrough to accommodate companion horizontal bus bars, said supports having peripherally extending shoulders at the opposite sides thereof of different thicknesses, one thickness being a multiple of the other thickness, said mounting frames having a peripherally extending mounting edge of a thickness substantially equal to said one thickness, whereby the same insulator support may be disposed to selectively interfit at one side with a companion frame in flush relation with the mounting edge thereof or at the opposite side with a pair of said frames positioned back-to-back in flush relation with the mounting edges thereof.

14. A section structure for removably mounting electrical apparatus units, comprising four upright narrow flanged wall elements disposed in pairs at the opposite sides of the structure and frame means securing said opposite upright wall elements in fixedly spaced confronting disposition, pairs of flanged filler members vertically spaced apart and disposed between said respective pairs of said upright wall elements at each side of the structure, flanges of said filler members being secured to respective flanges of said upright wall elements, said filler members having integral portions projecting inward from the sides of the structure toward the interior thereof, pairs of horizontally projecting supporting members for removable electrical units secured to said inward projecting portions of said filler members, said supporting members being disposed in horizontal alignment, vertically disposed bus bars positioned in said structure adapted for plug-in connection by said units, and means secured to the inwardly projecting portions of said filler members for supporting said bus bars.

References Cited in the file of this patent
UNITED STATES PATENTS

| | | |
|---|---|---|
| 1,955,287 | Graves | Apr. 17, 1934 |
| 2,441,485 | Graves | May 11, 1948 |
| 2,542,853 | Willis | Feb. 20, 1951 |
| 2,645,743 | Smidt | July 14, 1953 |
| 2,719,251 | Stewart | Sept. 27, 1955 |
| 2,733,289 | Warren | Jan. 31, 1956 |
| 2,782,358 | Kozinski | Feb. 19, 1957 |